May 26, 1931.                    W. O. MOODY                    1,806,700
                              BRAKE HANGER SUPPORT
                              Filed Dec. 5, 1928
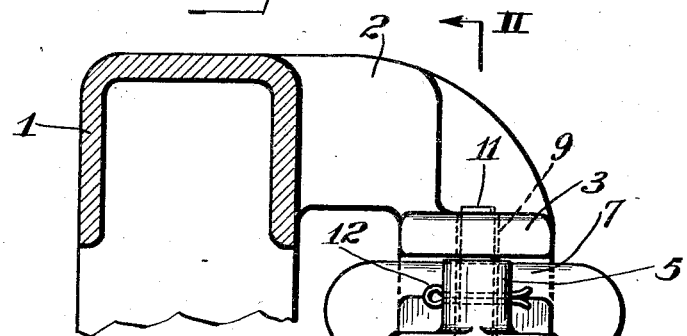
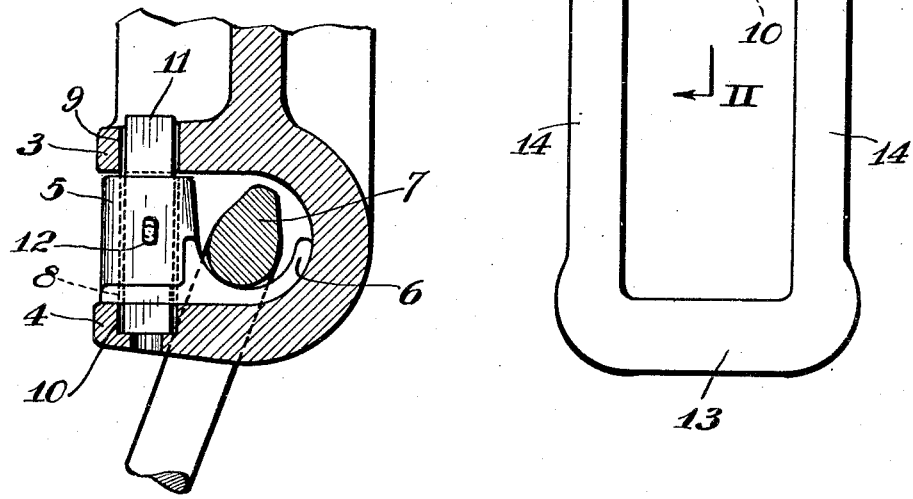
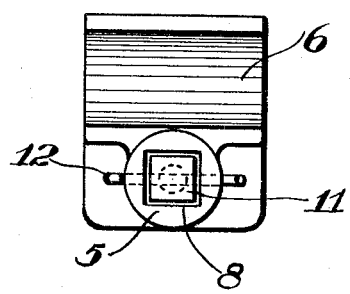
WITNESS                                                         INVENTOR Patented May 26, 1931

1,806,700

UNITED STATES PATENT OFFICE

WILLIAM O. MOODY, OF LA GRANGE, ILLINOIS, ASSIGNOR TO FREDERIC SCHAEFER, OF PITTSBURGH, PENNSYLVANIA

BRAKE HANGER SUPPORT

Application filed December 5, 1928. Serial No. 323,870.

The invention relates to the attachment of brake hangers to the side frames of railway car trucks, the object being to provide a simple, effective and readily applicable and removable means for retaining a brake hanger in a side frame bracket, and for relieving the bracket from becoming worn by a brake hanger.

The invention is illustrated in the accompanying drawings, of which Fig. 1 is a transverse vertical sectional view of the upper cord of a truck frame having a brake hanger supporting bracket attached to it, the bracket being shown in elevation together with a brake hanger and retaining means; Fig. 2 a vertical sectional view to enlarge scale on the plane indicated by the line II—II, Fig. 1; and Fig. 3 a plan view of the brake hanger retainer shown in Figs. 1 and 2.

Having reference to the illustrative embodiment of the invention, the top cord of a truck frame 1 is shown as being provided integrally with a brake hanger bracket 2 having at its lower end an upper wall 3 and a lower wall 4 which form a horizontally-disposed slot, open at its sides and outer end for receiving a brake hanger, the slot being here shown as lying definitely in a horizontal plane rather than being upwardly inclined as they are in some instances.

According to this invention, there is provided a brake hanger retainer arranged in the outer end of the bracket slot and provided with a wearing shoe for the hanger. The retainer and the walls of the bracket are provided with registering non-circular openings in which there is arranged a non-circular pin which holds the retainer in place and locks its wearing shoe in operative position against lateral movements. Means are provided for holding the pin in these registering openings in such a way that it will not be jarred out of service, but may be readily removed for replacement when necessary or desirable.

In the illustrative embodiment of the invention the retainer comprises a boss 5 which substantially closes the outer end of the slot formed between bracket walls 3 and 4. Projecting laterally from the lower portion of the boss, and formed integrally with it, there is a wearing shoe 6 of such curved configuration as to properly form a bearing for supporting the upper horizontal yoke 7, or pin, of a brake hanger. As shown in Fig. 3, boss 5 is provided centrally with an opening 8 which is square in cross section. Upper bracket wall 3 is provided with a like opening 9 (Fig. 2), and lower bracket wall 4 is provided with a like opening 10, smaller at its lower than at its upper end to form a seat for a pin 11. This pin is shown as being square in cross section, and extending through the registering openings 8 of boss 5, and 9 and 10 of bracket walls 3 and 4. The pin holds the brake hanger retaining member in position, and, being non-circular and arranged in non-circular openings, it locks the wearing shoe portion 6 of the retainer against lateral movements, or in other words holds it in operative position for forming a bearing for the brake hanger. To hold pin 11 in these openings, it and boss 5 may be provided with registering openings for receiving a cotter pin 12.

The brake hanger shown as being attached to the bracket is of the rectangular closed link type, having an upper yoke 7, a lower yoke 13 and side arms 14, the upper yoke being elongate in cross section and larger at its inner than at its outer edge, thus distributing the metal to meet the conditions of wear. It will be understood however that other types and forms of brake hangers may be similarly attached to brackets of the type here contemplated.

The brake hanger retaining means herein provided is simple in construction and effective in operation. In attaching a brake hanger to a bracket, it is only necessary to engage the upper portion of the hanger by wearing shoe 6 of the retaining member, place the retaining member in the bracket and slot, insert pin 11 through the registering openings of the bracket walls and retaining member, and insert cotter pin 12 or an equivalent pin locking member. To remove or replace the retaining member, it is only necessary to remove cotter pin 12, and by a suitable tool projecting upwardly through the smaller portion of opening 10, move pin 11 upwardly.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as specifically shown and described.

I claim as my invention:

1. The combination with a truck frame for railway cars provided with a bracket having upper and lower walls forming a slot open at its sides and outer end for receiving a brake hanger, of a brake hanger retainer in the outer end of said slot and provided with a wearing shoe for a brake hanger, said retainer and said walls being provided with registering non-circular openings, and a non-circular pin in said openings locking the retainer and its shoe in operative position and against rotary movements on the axis of the pin.

2. The combination with a truck frame for railway cars provided with a bracket having upper and lower walls forming a slot open at its sides and outer end for receiving a brake hanger, of a brake hanger retainer closing the outer end of said slot and provided with a wearing shoe for supporting a brake hanger, said retainer and said walls being provided with registering non-circular openings, a non-circular pin in said openings locking the retainer and its shoe in operative position and against rotary movements on the axis of the pin, and means for holding said pin in said openings.

3. The combination with a truck frame for railway cars provided with a bracket having upper and lower walls forming a slot open at its sides and outer end for receiving a brake hanger, of a brake hanger retainer closing the outer end of said slot and provided with a wearing shoe for supporting a brake hanger, said retainer and said walls being provided with registering non-circular openings, the opening in the lower bracket wall being smaller at its lower than at its upper end, a non-circular pin in said openings locking the retainer and its shoe in operative position, and means for holding said pin in said openings.

4. The combination with a truck frame for railway cars provided with a bracket having upper and lower walls forming a slot open at its sides and outer end for receiving a brake hanger, of a brake hanger retainer comprising a boss closing the outer end of said slot and a plate-like wearing shoe extending laterally from and formed integrally with said boss, said boss and said bracket walls being provided with registering non-circular openings, a non-circular pin in said registering openings holding the retainer in place and locking its shoe in operative position, and a cotter extending transversely through said pin and retainer boss.

In testimony whereof, I sign my name.

WILLIAM O. MOODY.